US008872675B2

(12) United States Patent
Niwa

(10) Patent No.: US 8,872,675 B2
(45) Date of Patent: Oct. 28, 2014

(54) VEHICULAR TRAVEL GUIDANCE DEVICE, VEHICULAR TRAVEL GUIDANCE METHOD, AND COMPUTER PROGRAM

(75) Inventor: Toshiaki Niwa, Okazaki (JP)

(73) Assignee: Aisin AW Co., Ltd., Anjo-shi (JP)

( * ) Notice: Subject to any disclaimer, the term of this patent is extended or adjusted under 35 U.S.C. 154(b) by 520 days.

(21) Appl. No.: 13/017,947

(22) Filed: Jan. 31, 2011

(65) Prior Publication Data

US 2011/0241905 A1    Oct. 6, 2011

(30) Foreign Application Priority Data

Mar. 31, 2010    (JP) ................................. 2010-081140

(51) Int. Cl.
*B60L 9/00*    (2006.01)
*A47B 1/00*    (2006.01)
*G08B 21/00*    (2006.01)
*G08G 1/123*    (2006.01)
*G01C 21/36*    (2006.01)

(52) U.S. Cl.
CPC .................................. *G01C 21/3682* (2013.01)
USPC ................. 340/995.1; 340/636.1; 340/636.19; 340/994; 340/995; 701/22; 180/65.1

(58) Field of Classification Search
None
See application file for complete search history.

(56) References Cited

U.S. PATENT DOCUMENTS

| 5,539,399 | A | 7/1996 | Takahira et al. |
| 6,721,637 | B2 | 4/2004 | Abe et al. |
| 6,864,807 | B2 | 3/2005 | Todoriki et al. |
| 2003/0006914 | A1* | 1/2003 | Todoriki et al. ................ 340/995 |
| 2008/0067973 | A1* | 3/2008 | Ishikawa et al. ............... 320/104 |
| 2010/0007481 | A1* | 1/2010 | Uchida .......................... 340/455 |
| 2010/0106401 | A1* | 4/2010 | Naito et al. .................... 701/201 |
| 2010/0138098 | A1 | 6/2010 | Takahara et al. |

FOREIGN PATENT DOCUMENTS

| EP | 0 638 887 | A2 | 2/1995 |
| EP | 1 275 936 | A2 | 1/2003 |
| EP | 2 172 740 | A1 | 4/2010 |
| JP | 7-85397 | A | 3/1995 |
| JP | 9-210702 | A | 8/1997 |
| JP | 10-336801 | A | 12/1998 |
| JP | 2003-21522 | A | 1/2003 |

(Continued)

OTHER PUBLICATIONS

Japanese Office Action issued in corresponding Japanese Application No. 2010-081140 dated Jul. 3, 2012.

(Continued)

*Primary Examiner* — George Bugg
*Assistant Examiner* — Renee Dorsey
(74) *Attorney, Agent, or Firm* — Sughrue Mion, PLLC

(57) ABSTRACT

A vehicular travel guidance apparatus and method are provided. The apparatus includes a map image display unit that displays a map image on a display device and a maximum energy amount acquisition unit that acquires a maximum charging energy amount of an in-vehicle battery. The apparatus further includes a charging facility information acquisition unit that acquires information regarding a charging facility capable of charging the in-vehicle battery. Also included is a travelable area acquisition unit that acquires a travelable area, within which the vehicle is able to travel from the charging facility by consuming an energy amount corresponding to a predetermined percentage of the maximum charging energy amount. The apparatus also includes a display mode change unit that varies a display mode of the map image based on the acquired travelable area.

11 Claims, 7 Drawing Sheets

(56) References Cited

FOREIGN PATENT DOCUMENTS

| | | |
|---|---|---|
| JP | 2003-32803 A | 1/2003 |
| JP | 2008-309544 A | 12/2008 |
| JP | 2009-025128 A | 2/2009 |
| JP | 2009-208484 A | 9/2009 |
| WO | 2009/011393 A1 | 1/2009 |
| WO | 2010/033517 A2 | 3/2010 |

OTHER PUBLICATIONS

Extended European Search Report, dated Dec. 4, 2013, issued in counterpart European Patent Application No. 11152722.2.

* cited by examiner

FIG. 3

| FACILITY NUMBER | 10001 | 10002 | 10003 | ... |
|---|---|---|---|---|
| FACILITY NAME | XX STORE | XY PARKING LOT | YY STATION | ... |
| FACILITY CATEGORY | MALL/CHARGING FACILITY | PARKING LOT/CHARGING FACILITY | CHARGING FACILITY | ... |
| POSITION COORDINATE | (x1,y1) | (x2,y2) | (x3,y3) | ... |
| ... | ... | ... | ... | ... |

VEHICULAR TRAVEL GUIDANCE DEVICE, VEHICULAR TRAVEL GUIDANCE METHOD, AND COMPUTER PROGRAM

INCORPORATION BY REFERENCE

This application claims priority from Japanese Patent Application No. 2010-081140 filed on Mar. 31, 2010, including the specification, drawings and abstract thereof, the disclosure of which is incorporated herein by reference in its entirety.

BACKGROUND OF THE INVENTION

1. Field of the Invention

Aspects of the present invention relate to a vehicular travel guidance device, a vehicular travel guidance method, and a computer program that provides information regarding a charging facility for charging an in-vehicle battery.

2. Description of the Related Art

In the related art, many vehicles are mounted with a navigation device that performs travel guidance for the vehicle in order to enable a driver to easily arrive at a desired destination. The navigation device here is a device that is capable of detecting a current position of a host vehicle with use of a GPS receiver and the like, acquiring map data corresponding to the current position through a network, or a recording medium such as a DVD-ROM, a hard disk drive (HDD), or the like, and displaying such data on a liquid crystal monitor. Further, such navigation device provides information on a category and a position of a facility existing in the vicinity of the current position of the host vehicle and provides information on the position of the facility corresponding to the category designated by a user and a route to the facility.

Also, in addition to a gasoline vehicle having an engine as a drive source, there exist electric vehicles using an electric motor that is driven based on electric power supplied from a battery as the drive source, a hybrid vehicle using the electric motor in combination with the engine as the drive source, and the like.

In order to charge the battery mounted in the electric or hybrid vehicle, there are various methods such as charging the battery with regenerative electric power generated by the motor while the vehicle is decelerating or traveling down a slope, charging the battery with use of a generator driven based on the engine, and also charging the battery at a home or a vehicular charging facility. In addition, in the electric vehicle and the hybrid vehicle, a distance that can be traveled using only the electric motor as the drive force is limited even when the battery is fully charged.

Consequently, in the case of electric and hybrid vehicles, it has been beneficial to provide information on the charging facility provided with a charging unit that is capable of charging the battery. For example, Japanese Patent Application; Publication No. JP-A-2009-25128 discloses a technology that, in addition to displaying a map of the vicinity of the vehicle, calculates, for each charging time of the battery such as 10, 20, and 30 minutes, a travelable area from the current position of the vehicle after the charging. This technology also displays the calculated travelable area on the map, and provides information on the facility located in the travelable area.

SUMMARY OF THE INVENTION

Here, according to the technology disclosed by Japanese Patent Application; Publication No. JP-A-2009-25128, if there is a charging facility in the travelable area, the user is able to recognize the position of the charging facility and the charging time of the battery required for traveling to the charging facility. In the technology disclosed by Japanese Patent Application; Publication No. JP-A-2009-25128, it is possible to provide information on the position of the charging facility in the vicinity of the vehicle. However, it is not possible to provide the information on the charging facility not being in the vicinity of the vehicle (for example, the charging facility located outside a display area of a display). In addition, if facility search is performed, the user is also able to obtain the information on the charging facility located far from the vehicle. However, in this case, it is difficult for the user to gain a positional relation between the current position of the vehicle and the charging facility. Further, it is not possible to provide information on the charging facility in association with the travelable area.

In addition, in the technology disclosed by Japanese Patent Application; Publication No. JP-A-2009-25128, there is a problem that it is not possible to distinguish between an area covered and an area not covered by the charging facility. For example, in the area covered by the charging facility, which is the area where the charging facilities are densely distributed, the user is able to travel without paying much attention to a remaining amount of the battery because the user easily stops by a nearby charging facility when the remaining amount of the in-vehicle battery decreases. On the other hand, in the area not covered by the charging facility, which is the area where the charging facilities are scarcely distributed, the user necessarily stops by the charging facility well in advance during travel because the user cannot easily stop by a nearby charging facility when the remaining amount of the in-vehicle battery decreases. In the technology disclosed by Japanese Patent Application; Publication No. JP-A-2009-25128, it is possible to determine the travelable area from the current position of the vehicle and the position of the charging facility. However, it is not possible to distinguish between the area covered and the area not covered by the charging facility only by the travelable area from the current position of the vehicle and the position of the charging facility, in the same manner as above.

In light of the problems described above, it is an aspect of the present invention to provide a vehicular travel guidance device, a vehicular travel guidance method, and a computer program that enable the user to distinguish the area covered and the area not covered by the charging facility and thus enable the user to drive according to the area being traveled by the vehicle.

In order to achieve the above-mentioned aspects, a vehicular travel guidance device (1) according to a first aspect includes: a map image display unit (13) that displays a map image on a display device (15); a maximum energy amount acquisition unit (13) that acquires a maximum charging energy amount of an in-vehicle battery (3) of a vehicle (2) that has a drive motor (5) as a drive source, the drive motor being driven by energy stored in the in-vehicle battery; a charging facility information acquisition unit (13) that acquires information regarding a charging facility (4) capable of charging the in-vehicle battery; a travelable area acquisition unit (13) that, based on the maximum charging energy amount acquired by the maximum energy amount acquisition unit and the information regarding the charging facility acquired by the charging facility information acquisition unit, acquires a travelable area (52 to 54), within which the vehicle is able to travel from the charging facility by consuming an energy amount corresponding to a predetermined percentage of the maximum charging energy amount; and a display mode change unit (13) that varies a display mode of the map based on the acquired travelable area. The display mode change unit may also vary the display mode between the map image included in the travelable area and the map image not included in the travelable area.

Note that the maximum charging energy amount is a maximum amount of energy that can charge the in-vehicle battery.

The vehicular travel guidance device (1) according to a second aspect includes, in the vehicular travel guidance device according to the first aspect, a travelable area acquisition unit (13) acquires the travelable area (52 to 54) for each of a plurality of percentages, each representing a different predetermined percentage of the maximum charging amount and the display mode change unit (13) varies the display mode of the map based on the acquired travelable areas. The display mode change unit may also vary the display mode between the map image included in the travelable areas and the map image not included in the travelable areas for each of a plurality of the travelable areas.

The vehicular travel guidance device (1) according to a third aspect includes, in the vehicular travel guidance device according to the first or the second aspect of the present invention, a charging facility search unit (13) that searches for the charging facility (4) located in the travelable area, within which the vehicle (2) is able to travel from a predetermined point on the map image displayed on the display device (15) by consuming the maximum charging energy amount, wherein the travelable area acquisition unit (13) acquires the travelable area (52 to 54), within which the vehicle is able to travel from the charging facility searched by the charging facility search unit.

The vehicular travel guidance device (1) according to a fourth aspect includes, in the vehicular travel guidance device according to any one of the first to the third aspects of the present invention, a battery remaining amount guidance unit (13) that provides information on a remaining energy amount of the in-vehicle battery (3) using a color corresponding to a percentage of the maximum charging energy amount, wherein the display mode change unit (13) displays the map image included in the travelable area (52 to 54), within which the vehicle is able to travel by consuming the energy amount corresponding to the predetermined percentage of the maximum charging energy amount, in the color corresponding to the predetermined percentage among colors given by the battery remaining amount guidance unit for providing the information.

A vehicular travel guidance method according to a fifth aspect includes the steps of displaying a map image on a display device (15); acquiring a maximum charging energy amount of an in-vehicle battery (3) of a vehicle (2) that has a drive motor (5) as a drive source, the drive motor being driven by energy stored in the in-vehicle battery; acquiring information regarding a charging facility (4) capable of charging the in-vehicle battery; acquiring, based on the maximum charging energy amount acquired at the maximum energy amount acquisition step and the information regarding the charging facility acquired at the charging facility information acquisition step, a travelable area (52 to 54), within which the vehicle is able to travel from the charging facility by consuming an energy amount corresponding to a predetermined percentage of the maximum charging energy amount; and varying a display mode between the map image included in the travelable area and the map image not included in the travelable area.

A program according to a sixth aspect is a program for causing a computer to perform the functions of displaying a map image on a display device (15); acquiring a maximum charging energy amount of an in-vehicle battery (3) of a vehicle (2) that has a drive motor (5) as a drive source, the drive motor being driven by energy stored in the in-vehicle battery; acquiring information regarding a charging facility (4) capable of charging the in-vehicle battery; acquiring, based on the maximum charging energy amount acquired by the maximum energy amount acquisition function and the information regarding the charging facility acquired by the charging facility information acquisition function, a travelable area (52 to 54), within which the vehicle is able to travel from the charging facility by consuming an energy amount corresponding to a predetermined percentage of the maximum charging energy amount; and varying a display mode between the map image included in the travelable area and the map image not included in the travelable area.

According to the vehicular travel guidance device of the first aspect having the above-mentioned structure, the map image included and the map image not included in the travelable area, within which the vehicle is able to travel from the charging facility by consuming the energy amount corresponding to the predetermined percentage of the maximum charging energy amount, are displayed in different display modes. Therefore, it is possible to make the user distinguish between the area covered and the area not covered by the charging facility. As a result, it becomes possible to make the user to drive according to the area being traveled by the vehicle.

According to the vehicular travel guidance device of the second aspect, the travelable areas are acquired for the respective kinds of the percentages to the maximum charging energy amount and the map image included and the map image not included in the respective travelable areas are displayed in different display modes. Therefore, when the vehicle travels in the travelable area, it is possible to make the user to determine a specific time to stop by the charging facility. As a result, it becomes possible to make the user to drive according to the area being traveled by the vehicle.

According to the vehicular travel guidance device of the third aspect, the charging facility subject to acquire the travelable area can be limited to the charging facility for which the travelable area is required to display. Therefore, the processing load of a CPU can be reduced, and also the processing time can be shortened.

According to the vehicular travel guidance device of the fourth aspect, by referring to the displayed color of the map image displayed on the display device, it is possible for the user to visually and easily recognize that each area on the map image corresponds to the travelable area corresponding to what percentage of the maximum charging energy amount.

According to a vehicular travel guidance method of the fifth aspect, the map image included and the map image not included in the travelable area, within which the vehicle is able to travel from the charging facility by consuming the energy amount corresponding to the predetermined percentage of the maximum charging energy amount, are displayed in different display modes. As a result, it becomes possible to make the user to drive according to the type of the area being traveled by the vehicle.

According to a program of the sixth aspect, the map image included and the map image not included in the travelable area, within which the vehicle is able to travel from the charging facility by consuming the energy amount corresponding to the predetermined percentage of the maximum charging energy amount, are displayed in different display modes. As a result, it becomes possible to make the user to drive according to the type of the area being traveled by the vehicle.

BRIEF DESCRIPTION OF THE DRAWINGS

FIG. 3 shows an example of facility data of facilities, in particular, corresponding to charging facilities among the facility data.

DETAILED DESCRIPTION OF THE NON-LIMITING EMBODIMENT

Hereinafter, an embodiment of a vehicular travel guidance device that is implemented in a navigation device will be explained in detail with reference to the drawings.

Figure 1:
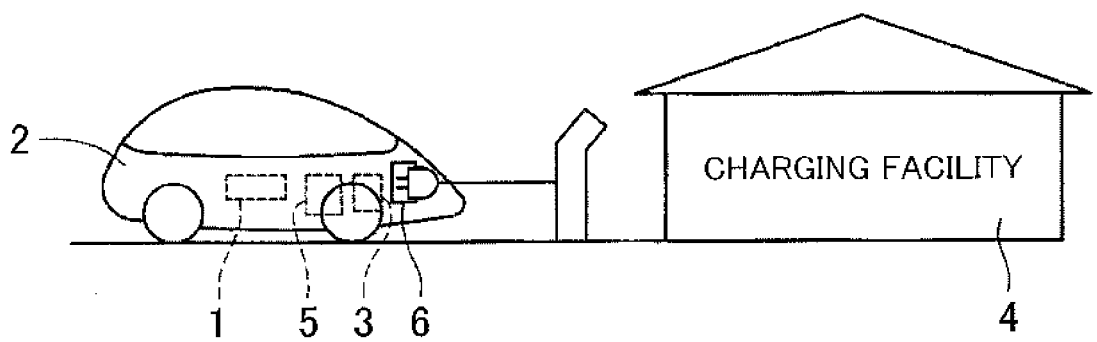
FIG. 1 is a schematic view of a charging facility and a vehicle provided with a navigation device according to a non-limiting embodiment as an in-vehicle-device.

First, a vehicle 2 in which a navigation device 1 according to the present embodiment is mounted as an in-vehicle device and a charging facility 4 provided with a charging unit that performs charging of a battery 3 mounted in the vehicle 2 will be explained with reference to FIG. 1. FIG. 1 is a schematic view of the charging facility 4 and the vehicle 2 provided with the navigation device 1 according to the present embodiment as the in-vehicle device.

The vehicle 2 provided with a battery 3 and a drive motor 5 is a vehicle of which the battery 3 can be charged from an external electric source. The battery 3 stores electric energy as well as supplies the stored electric energy to the vehicle 2. The drive motor 5 is driven by the electric energy supplied from the battery 3. As the vehicle of which the battery 3 can be charged from the external electric source, includes are an electric vehicle using only a motor as a drive source and a plug-in hybrid vehicle using the motor in combination with an engine as the drive source. In the present embodiment that will be described below, the electric vehicle is used. In addition, the drive motor 5, which also functions as a regenerative brake when engine braking is necessary and at braking, is capable of regenerating vehicular inertial energy as the electric energy and charging the battery 3.

The charging facility 4 is a facility having a charging unit that is capable of charging the battery 3 by connecting a cord to a charging connector 6 provided in the vehicle 2. A home, a parking lot of a commercial facility, a vehicular charging station, and the like correspond to the charging facility.

Figure 2:
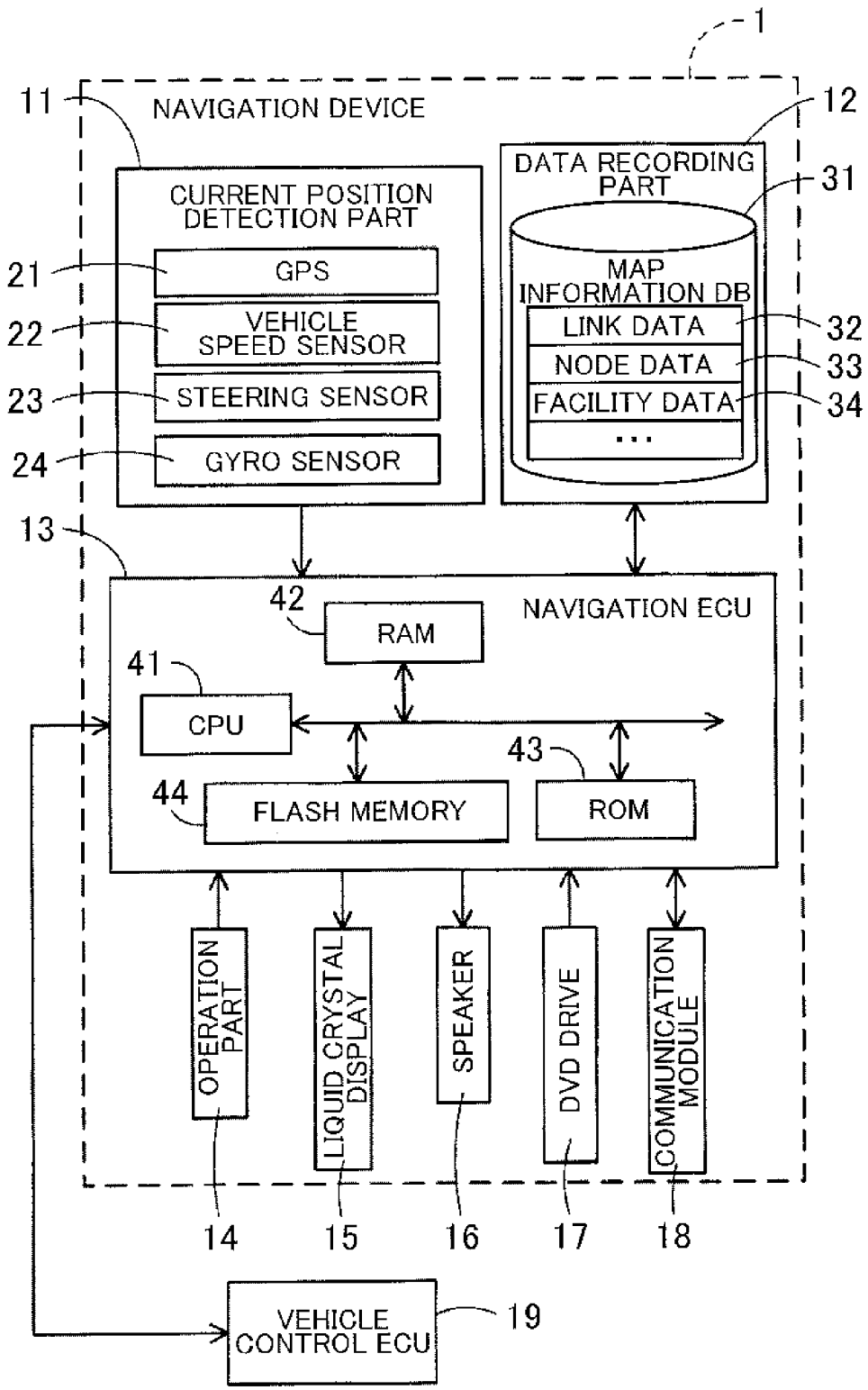
FIG. 2 is a block diagram showing a navigation device according to the embodiment.

Next, a structure of the navigation device 1 according to the present embodiment is explained with reference to FIG. 2. FIG. 2 is a block diagram showing the navigation device 1 according to the present embodiment.

As shown in FIG. 2, the navigation device 1 according to the present embodiment includes a current position detection part 11 that detects a current position of the vehicle 2, a data recording part 12 in which various data is stored, a navigation ECU 13 that performs various kinds of arithmetic processing based on the input information, an operation part 14 that receives an operation by a user, a liquid crystal display 15 that displays a map in the vicinity of the vehicle and a set guidance route to the user, a speaker 16 that outputs audio guidance regarding route guidance, a digital video disc (DVD) drive 17 that reads a DVD as a storage medium storing a program, a communication module 18 that performs communication with an information center such as a probe center, a VICS (a registered trademark: Vehicle Information and Communication System) center, and the like. In addition, the navigation device 1 is connected, in a manner such that a two-way communication is available, with a vehicle control unit (ECU) 19 that is an electric control unit for performing overall control of the vehicle 2 including the battery 3 and the drive motor 5 mounted in the vehicle 2.

Hereinafter, the respective components composing the navigation device 1 are described.

The current position detecting part 11 is formed of a global positioning system (GPS) 21, a vehicle speed sensor 22, a steering sensor 23, a gyro sensor 24, and the like, and can detect a current position and a direction of the vehicle, a traveling speed of the vehicle, a current time, and the like. Here, in particular, the vehicle speed sensor 22 is a sensor for detecting a moving distance and a speed of the vehicle. The speed sensor 22 generates pulses in accordance with a rotation of drive wheels of the vehicle 2, and outputs pulse signals to the navigation control unit (ECU) 13. Subsequently, by counting the number of generated pulses, the navigation ECU 13 calculates a rotation speed of the drive wheels and the moving distance. Note that the navigation device 1 is not required to include all the aforementioned five kinds of sensors, and the navigation device 1 may include only one or a plurality of kinds of sensors among them.

The data recording part 12 is provided with a hard disk (not shown) serving as an external storage device and a recording medium, and a recording head (not shown) serving as a driver for reading a map information DB 31, a predetermined program, and the like, which are recorded in the hard disk, and writing predetermined data in the hard disk.

Here, the map information DB 31 is a storage unit storing, for example, link data 32 regarding roads (links), node data 33 regarding node points, facility data 34 regarding facilities, map display data for displaying a map, intersection data regarding respective intersections, search data for searching for routes, search data for searching for points, and the like.

Here, as the facility data 34, information relating to the facilities serving as a departure point, a destination, a guidance target, and the like in the navigation device 1 is stored. For example, the information relating to the charging facility 4 at which the battery 3 can be charged, accommodation facilities such as hotels and the like, commercial facilities such as malls, supermarkets, and the like, amusement facilities such as theme parks, arcades, and the like, eating and drinking establishments such as restaurants, bars, and the like, and parking facilities such as public parking lots and the like are included as the facility data 34. In addition, the facility data 34 includes, for each facility, a facility number as an identifier of a facility, a name of the facility, a category of the facility, a position coordinate of the facility, and the like. FIG. 3 shows an example of facility data 34 of facilities, in particular, corresponding to the charging facilities among the facility data 34. As shown in FIG. 3, as the facility data 34 of the charging facilities, the facility number, the name of the facility, the category of the facility, and the position coordinate of the facility are stored.

The navigation ECU 13 provides information on a travelable area of the vehicle 2 in a case in which the charging facility 4 is set as a travel start point based on the facility data 34, as mentioned later.

On the other hand, the navigation ECU (electronic control unit) 13 is an electric control unit that performs overall control of the navigation device 1, when the destination has been selected, for route setting processing for setting the route from the departure point (the current position or the home) to the destination based on the link data stored in the map information DB 31; map image display processing for displaying a map image on the liquid crystal display 15; maximum energy amount acquisition processing for acquiring maximum charging energy amount of the battery 3; charging facility information acquisition processing for acquiring information regarding the charging facility; travelable area acquisition processing for acquiring, based on information regarding the maximum charging energy amount and the charging facility, the travelable area, within which the vehicle is able to travel from the charging facility by consuming an energy amount corresponding to a predetermined percentage of the maximum charging energy amount; display mode change processing for varying a display mode between the map image included and the map image not included in the travelable area. The navigation control unit (ECU) 13 is provided with: a central processing unit (CPU) 41 serving as a computing device and a control device; internal storage devices such as a random access memory (RAM) 42 used as a working memory when the CPU 41 executes various computing processing and in which route data or the like when the route has been searched is stored; a read only memory (ROM) 43 which records a program for control; a charging facility guidance processing program (refer to FIG. 4); and a flash memory 44 which records a program read from the ROM 43, and the like.

The operation part 14 is operated for inputting the departure point as a travel start point and the destination as a travel end point, and is composed of a plurality of operation switches (not shown) such as various keys, buttons, and the like. The navigation ECU 13 performs control so as to execute various kinds of operations corresponding to switch signals outputted by pressing the respective switches. The operation part 14 can be also composed of a touch panel provided on the surface of the liquid crystal display 15.

In addition, on the liquid crystal display 15, the map image including a road, traffic information, route guidance, an operation menu, key guidance, an expected travel route from the departure point to the destination, guidance information along the expected travel route, news, weather forecast, time, a mail, television programs, and the like are displayed. Further, on the liquid crystal display 15, the travelable area of the vehicle 2 in case that the charging facility in the vicinity of the vehicle is the travel start point is displayed together with the map image of the vicinity of the vehicle as described later.

The speaker 16 outputs audio guidance for traveling the expected travel route based on an instruction from the navigation ECU 13, and the traffic information.

The DVD drive 17 is a drive capable of reading data stored in the recording medium such as a DVD, a CD, and the like, and updates the map information DB 31 based on the read data.

The communication module 18 is a communication device for receiving the traffic information including congestion information, regulation information, traffic accident information, and the like, which is transmitted from a traffic information center such as a VICS center, a probe center, and the like. The communication module 18 corresponds to a cellular phone and a DCM for example.

Figure 4:
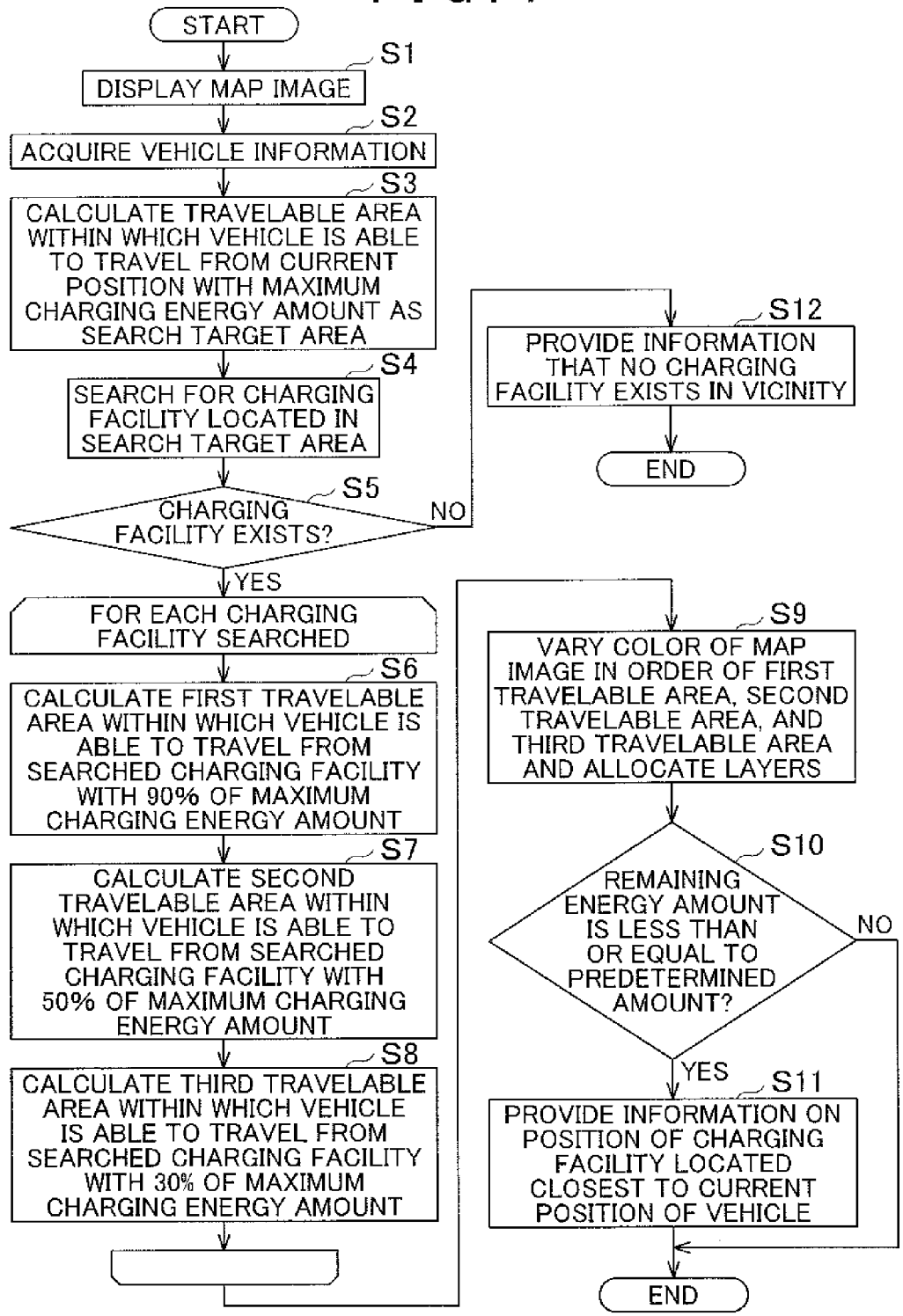
FIG. 4 is a flow chart of a charging facility guidance processing program according to the embodiment.

Subsequently, the charging facility guidance processing program executed by the CPU 41 in the navigation device 1 having the above-mentioned structure is explained with reference to FIG. 4. FIG. 4 is a flow chart of the charging facility guidance processing program according to the present embodiment. Here, the charging facility guidance processing program, which is executed when an ACC of the vehicle 2 has been set ON, is a program for providing the information on the charging facility 4 in the vicinity of the guidance route that is set in the navigation device 1. The program shown by the flow chart in FIG. 4 is stored in the RAM 42 or the ROM 43 provided in the navigation device 1 and is executed by the CPU 41.

First, at Step (hereinafter, referred to as "S") 1 of the charging facility guidance processing program, the CPU 41 displays the map image of the vicinity of the current position of the vehicle in a scale set in the navigation device 1 on the liquid crystal display 15. If the guidance route is set in the navigation device 1, the guidance route is overlapped with the map.

Next, at S2, the CPU 41 acquires vehicle information regarding the vehicle 2. Here, the vehicle information acquired at S2 corresponds to the current position of the vehicle 2, the maximum charging energy amount of the battery 3 installed in the vehicle 2, electric power consumption (travel distance per unit of energy amount), and the like. Note that the maximum charging energy amount of the battery 3 is the maximum amount of energy that can charge the battery 3, and is generally about 80% of battery capacity. Also note that the current position of the vehicle 2 is detected by the current position detection part 11. In addition, the maximum charging energy amount of the battery 3 and the electric power consumption may be previously stored in the data recording part 12, or may be acquired from the vehicle control ECU 19.

Subsequently, at S3, the CPU 41 calculates the travelable area, within which the vehicle 2 starting traveling from the current position is able to travel by consuming the maximum charging energy amount of the battery 3, based on the current position of the vehicle 2 acquired at the above-mentioned S2, the maximum charging energy amount of the battery 3 installed in the vehicle 2, and the electric power consumption. Thereafter, the CPU 41 sets the calculated travelable area as a search target area to be searched for the charging facility at S4 described later.

Specifically, the CPU 41 calculates the travelable area by the following processing of (A) and (B).

(A) Calculate a travelable distance that the vehicle 2 is able to travel by consuming the maximum charging energy amount of the battery 3.

(B) Calculate an area that is delimited by a circle centered at the current position of the vehicle 2 with a radius of the travelable distance as the travelable area.

The travelable area may be calculated based on the value of "a driving force and an energy amount necessary when the vehicle travels links" acquired from a shape (inclination, R, or the like) of roads in the vicinity. Or, the travelable area may be calculated in consideration of a regenerative energy amount charged during drive. Further, the travelable area may be calculated based on past driving histories.

Next, at S4, the CPU 41 sets the travelable area calculated at S3 as the search target area and searches for the charging facility located in the search target area. Specifically, the CPU 41 extracts all of the charging facilities having position coordinates in the search target area using the facility data 34 (see FIG. 3) stored in the map information DB 31.

At S5, the CPU 41 determines based on search result of the above-mentioned operation S4 whether or not the charging facility has been searched in the search target area. If it has been determined that the charging facility has been searched in the search target area (S5: YES), the procedure proceeds to S6. In contrast, if it has been determined that the charging facility has not been searched in the search target area (S5: NO), the procedure proceeds to S12. At S12, the CPU 41 provides information that no charging facility exists in the vicinity of the vehicle.

The subsequent processing of S6 to S8 is executed toward all of the charging facilities searched at the search processing at the above-mentioned operation S4 in order from the charging facility closest to the current position of the vehicle.

First, at S6, the CPU 41 calculates the travelable area, within which the vehicle 2 starting traveling from the charging facility subject to the processing is able to travel by consuming 90% of the maximum charging energy amount of the battery 3 (hereinafter, referred to as a first travelable area).

Specifically, the CPU 41 calculates the first travelable area by the following processing of (C) to (E).

(C) Acquire the position coordinate of the charging facility subject to the processing from the facility data 34.

(D) Calculate the travelable distance (hereinafter referred to as a first travelable distance) which the vehicle 2 is able to travel by consuming 90% of the maximum charging energy amount of the battery 3 based on the maximum charging energy amount of the battery 3 and the electric power consumption acquired at the above-mentioned S2.

(E) Calculate the area that is delimited by the circle centered at the charging facility subject to the processing with a radius of the first travelable distance as a first travelable area.

The travelable area, within which the vehicle 2 is able to travel by consuming the maximum charging energy amount of the battery 3, may be calculated first, and the area reduced to 90% of the calculated area may be calculated as the first travelable area.

Next, at S7, the CPU 41 calculates the travelable area, within which the vehicle 2 starting traveling from the charging facility subject to the processing is able to travel by consuming 50% of the maximum charging energy amount of the battery 3 (hereinafter referred to as a second travelable area).

Specifically, the CPU 41 calculates the second travelable area by the following processing of (F) to (H).

(F) Acquire the position coordinate of the charging facility subject to the processing from the facility data 34.

(G) Calculate the travelable distance (hereinafter referred to as a second travelable distance) which the vehicle 2 is able to travel by consuming 50% of the maximum charging energy amount of the battery 3 based on the maximum charging energy amount of the battery 3 and the electric power consumption acquired at the above-mentioned S2.

(H) Calculate the area that is delimited by the circle centered at the charging facility subject to the processing with a radius of the second travelable distance as a second travelable area.

The travelable area, within which the vehicle 2 is able to travel by consuming the maximum charging energy amount of the battery 3, may be calculated first, and the area reduced to 50% of the calculated area may be calculated as the second travelable area.

Further, at S8, the CPU 41 calculates the travelable area, within which the vehicle 2 starting traveling from the charging facility subject to the processing is able to travel by consuming 30% of the maximum charging energy amount of the battery 3 (hereinafter referred to as a third travelable area).

Specifically, the CPU 41 calculates the third travelable area by the following processing of (I) to (K).

(I) Acquire the position coordinate of the charging facility subject to the processing from the facility data 34.

(J) Calculate the travelable distance (hereinafter referred to as a third travelable distance) which the vehicle 2 is able to travel by consuming 30% of the maximum charging energy amount of the battery 3 based on the maximum charging energy amount of the battery 3 and the electric power consumption acquired at the above-mentioned S2.

(K) Calculate the area that is delimited by the circle centered at the charging facility subject to the processing with a radius of the third travelable distance as a third travelable area.

The travelable area, within which the vehicle 2 is able to travel by consuming the maximum charging energy amount of the battery 3, may be calculated first, and the area reduced to 30% of the calculated area may be calculated as the third travelable area.

Figure 5:
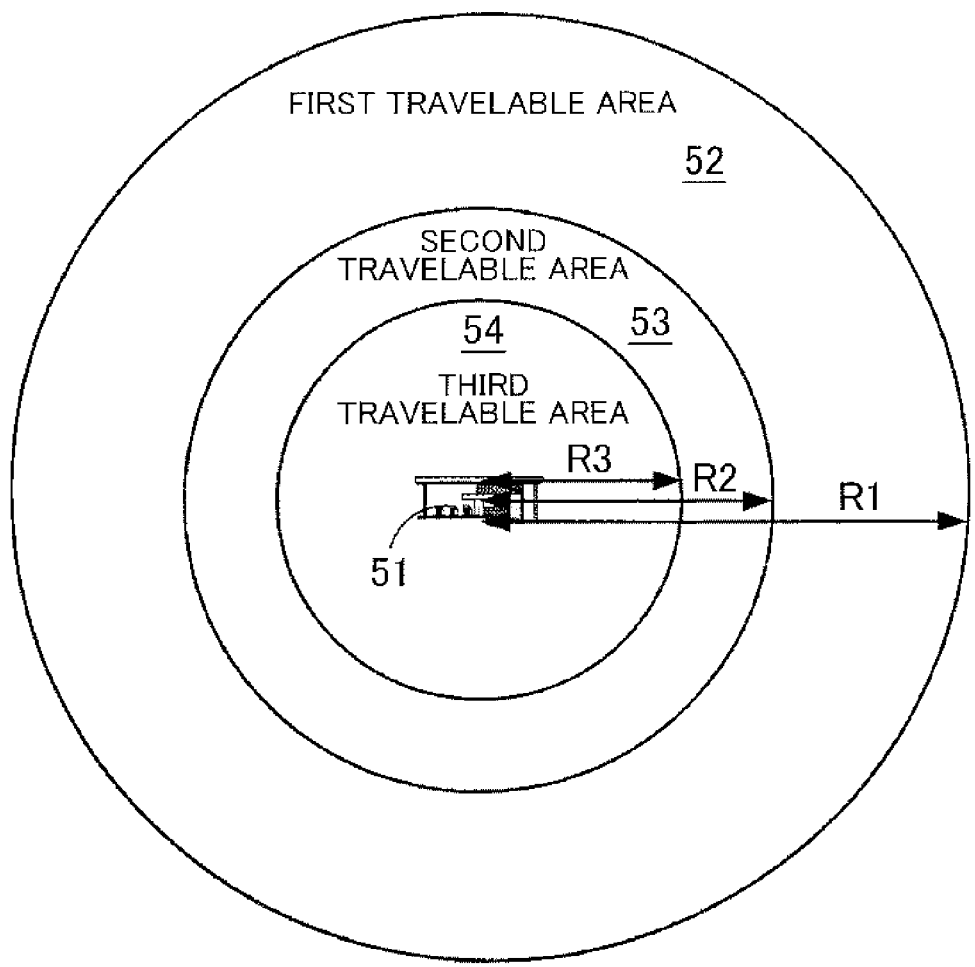
FIG. 5 shows an example of a first travelable area, a second travelable area, and a third travelable area set toward a charging facility.

Here, FIG. 5 shows a first travelable area 52, a second travelable area 53, and a third travelable area 54 that were calculated at the above-mentioned S6 to S8 toward a charging facility 51. As shown in FIG. 5, the first travelable area 52, the second travelable area 53, and the third travelable area 54 are circular areas centered at the charging facility 51. A radius R1 of the first travelable area 52 corresponds to the first travelable distance, which the vehicle 2 is able to travel by consuming 90% of the maximum charging energy amount of the battery 3. A radius R2 of the second travelable area 53 corresponds to the second travelable distance, which the vehicle 2 is able to travel by consuming 50% of the maximum charging energy amount of the battery 3. A radius R3 of the third travelable area 54 corresponds to the third travelable distance, which the vehicle 2 is able to travel by consuming 30% of the maximum charging energy amount of the battery 3.

After the processing of the above-mentioned S6 to S8 has been executed toward all of the charging facilities searched by the search processing at the above-mentioned S4, the procedure proceeds to S9. On the other hand, if the processing of the above-mentioned S6 to S8 is not executed toward all of the charging facilities searched by the search processing at the above-mentioned S4, the processing of the above-mentioned S6 to S8 is repeated toward each of the resting charging facilities as a new processing target.

At S9, the CPU 41 varies the display mode of the map image to be displayed on the liquid crystal display 15 based on the first travelable area 52, the second travelable area 53, and the third travelable area 54 calculated at the above-mentioned S6 to S8.

Specifically, first, the CPU 41 allocates a layer, in which the internal part of the first travelable area 52 calculated at the above-mentioned S6 is displayed in green, for the map image to be displayed on the liquid crystal display 15.

Nest, the CPU 41 allocates a layer, in which the internal part of the second travelable area 53 calculated at the above-mentioned S7 is displayed in yellow, for the map image to be displayed on the liquid crystal display 15.

Further, the CPU 41 allocates a layer, in which the internal part of the third travelable area 54 calculated at the above-mentioned S8 is displayed in red, for the map image to be displayed on the liquid crystal display 15.

Figure 6:
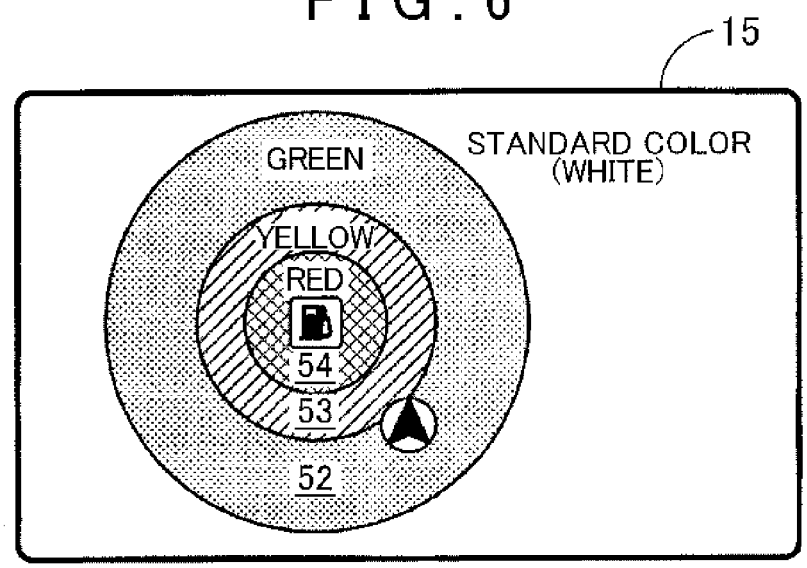
FIG. 6 shows a display mode of a map image displayed on a liquid crystal display.

As a result, as shown in FIG. 6, the map image not included in the first travelable area 52 is displayed in a standard color (for example, in white).

The map image included in the first travelable area 52 but not included in the second travelable area 53 (i.e., the map image of the area that the vehicle starting traveling from the charging facility is able to travel by consuming 50 to 90% of the maximum charging energy amount) is displayed in green.

The map image included in the second travelable area 53 but not included in the third travelable area 54 (i.e., the map image of the area that the vehicle starting traveling from the charging facility is able to travel by consuming 30 to 50% of the maximum charging energy amount) is displayed in yellow.

Further, the map image included in the third travelable area 54 (i.e., the map image of the area that the vehicle starting traveling from the charging facility is able to travel by consuming less than or equal to 30% of the maximum charging energy amount) is displayed in red.

Figure 7:
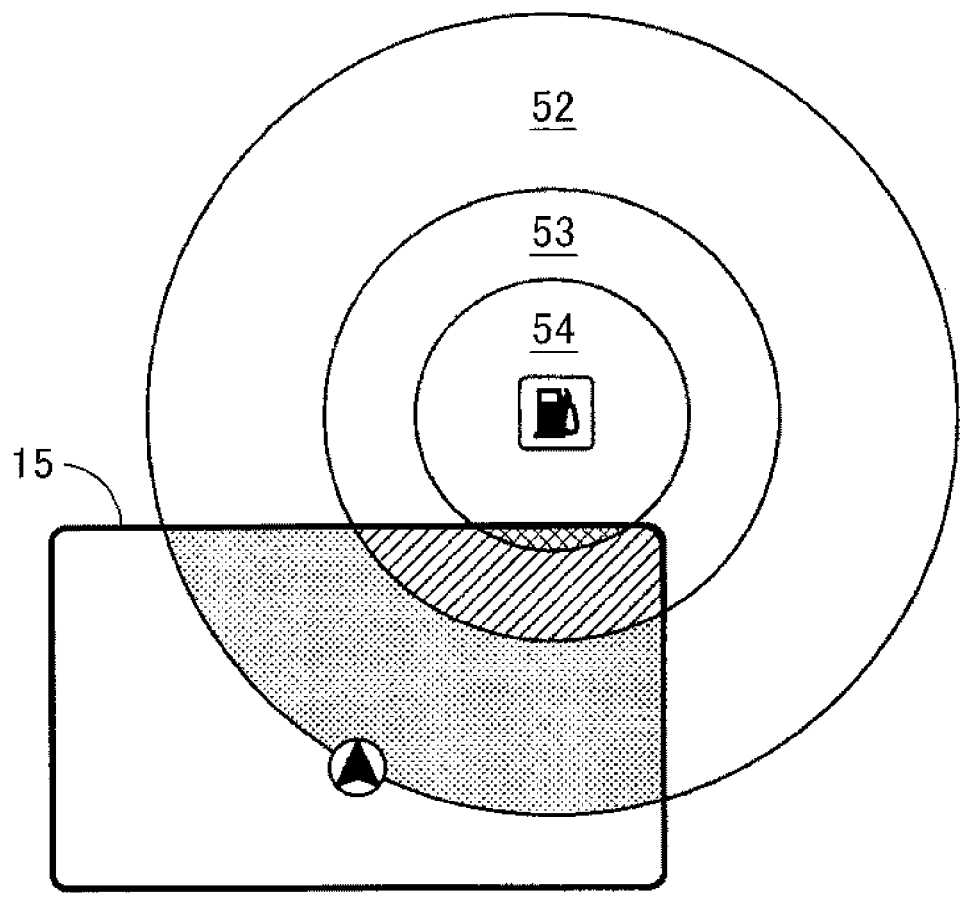
FIG. 7 shows the display mode of the map image displayed on the liquid crystal display if the charging facility is located outside a display area of the liquid crystal display.

In addition, as shown in FIG. 7, even if the charging facility is not located inside the display area of the liquid crystal display 15, when any of the first travelable area 52, the second travelable area 53, and the third travelable area 54 is included in the display area, the area included in the display area among the first travelable area 52, the second travelable area 53, and the third travelable area 54 is displayed.

Here, a current remaining energy amount of the battery 3 is displayed on an instrument panel of the vehicle 2. The current remaining energy amount of the battery 3 is displayed in different colors depending on what percentage it represents of the maximum charging energy amount. If the remaining energy amount is 50 to 100% of the maximum charging energy amount, the remaining energy amount is displayed in green. If the remaining energy amount is 30 to 50% of the maximum charging energy amount, the remaining energy amount is displayed in yellow. If the remaining energy amount is less than or equal to 30% of the maximum charging energy amount, the remaining energy amount is displayed in red. That is, the map image sectioned by the first travelable area 52, the second travelable area 53, and the third travelable area 54 is displayed in the colors (in green if the map image is included in the first travelable area 52 but not included in the second travelable area 53, in yellow if included in the second travelable area 53 but not included in the third travelable area 54, and in red if included in the third travelable area 54) corresponding to the colors (green if the remaining energy amount is 50 to 100%, yellow if 30 to 50%, and red if less than or equal to 30%) in which the remaining energy amount is displayed on the instrument panel of the vehicle 2.

Next, at S10, the CPU 41 determines whether or not the remaining energy amount of the battery 3 installed in the vehicle 2 is less than or equal to the predetermined amount (for example, 50% of a fully-charged amount). Note that the remaining energy amount of the battery 3 is acquired from the vehicle control ECU 19.

If it has been determined that the remaining energy amount of the battery 3 is less than or equal to the predetermined amount (S10: YES), the procedure proceeds to S11. On the other hand, if it has been determined that the remaining energy amount of the battery 3 is not less than or equal to the predetermined amount (S10: NO), the charging facility guidance processing program is terminated.

Figure 8:
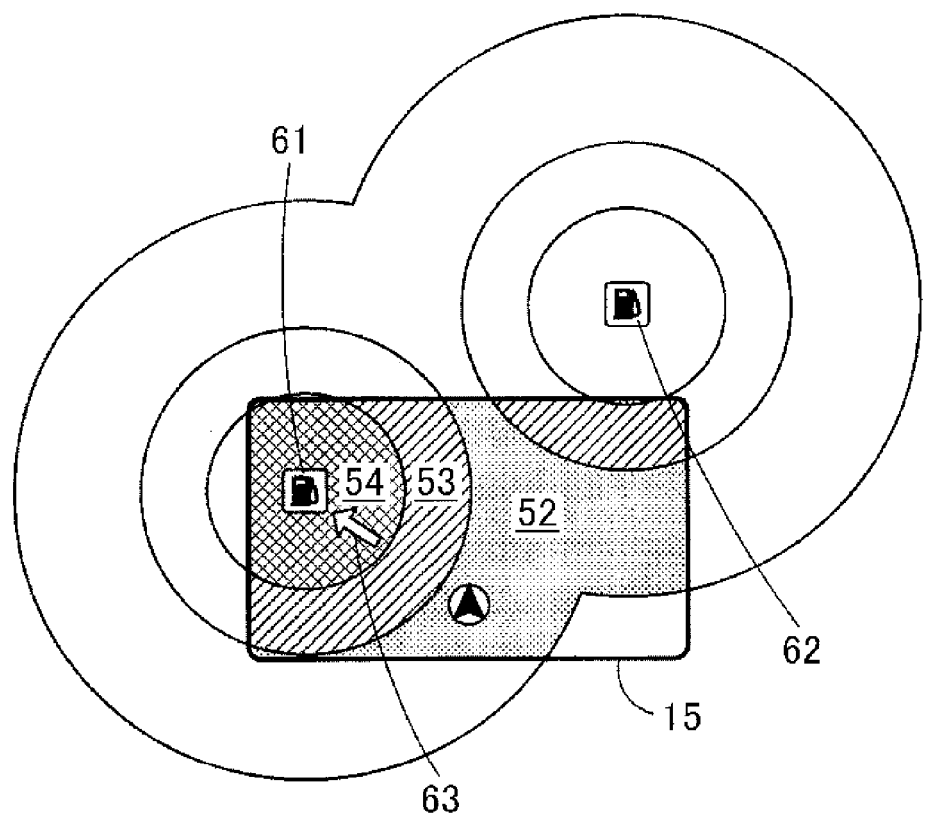
FIG. 8 shows the display mode of the map image displayed on the liquid crystal display if a remaining energy amount of a battery is less than or equal to a predetermined amount.

At S11, the CPU 41 provides information on the position of the charging facility located closest to the current position of the vehicle. Specifically, the CPU 41 displays an arrow indicating a direction, in which the relevant charging facility is located, on the liquid crystal display 15. For example, if a charging facility 61 and a charging facility 62 are located in the vicinity of the vehicle, an arrow 63 indicating a direction, in which the charging facility 61 that is closer to the current position of the vehicle is located, is displayed, as shown in FIG. 8. Consequently, the user is able to recognize the position and the direction of an adjacent charging facility by referring to the screen of the liquid crystal display 15. The name of the relevant charging facility may be displayed and the information on the route to the relevant charging facility may be provided at the above-mentioned S11.

As described in detail above, in the navigation device 1 according to the present embodiment, a vehicular travel guidance method by the navigation device 1, or a computer program executed in the navigation device 1; the charging facility located in the search target area is searched (S4); if the charging facility is located in the search target area, the first travelable area, within which the vehicle 2 starting traveling from the charging facility is able to travel by consuming 90% of the maximum charging energy amount of the battery 3, the second travelable area, within which the vehicle 2 starting traveling from the charging facility is able to travel by consuming 50% of the maximum charging energy amount of the battery 3, and the third travelable area, within which the vehicle 2 starting traveling from the charging facility is able to travel by consuming 30% of the maximum charging energy amount of the battery 3, are calculated (S6 to S8); and the display mode of the map image to be displayed on the liquid crystal display 15 is varied based on the first travelable area 52, the second travelable area 53, and the third travelable area 54 (S9). Therefore, it is possible to make the user to recognize the area covered by and the area not covered by the charging facility. As a result, it becomes possible to make the user to perform driving according to being traveled by the vehicle.

In addition, the map image included in the travelable area and the map image not included in the travelable area are displayed in different display modes for a plurality of travelable areas. Therefore, when the vehicle travels in the travelable areas, it is possible to make the user to determine a specific time to stop by the charging facility.

In addition, if the remaining energy amount of the battery 3 becomes less than or equal to the predetermined amount, the information on the position of the charging facility 4 that is closest to the current position of the vehicle is provided (S11). Therefore, it becomes possible to make the user to get aware of charging the battery 3 and also to provide the information on the appropriate charging facility 4 if the user desires to charge the battery 3.

In addition, the area, within which the vehicle is able to travel from the current position of the vehicle with the maximum charging energy amount, is set as the search target area (S3, S4). Therefore, the charging facility subject to calculate the travelable areas can be limited to the charging facility for which the travelable areas are required to display. As a result the processing load of the CPU can be reduced, and also the processing time can be shortened.

Further, the map image sectioned by the first travelable area 52, the second travelable area 53, and the third travelable area 54 is displayed in the colors (in green if the map image is included in the first travelable area 52 but not included in the second travelable area 53, in yellow if included in the second travelable area 53 but not included in the third travelable area 54, and in red if included in the third travelable area 54) corresponding to the colors (green if the remaining energy amount is 50 to 100%, yellow if 30 to 50%, and red if less than or equal to 30%) in which the remaining energy amount is displayed on the instrument panel of the vehicle 2. Therefore, by referring to the displayed color of the map image displayed on the liquid display 15, it is possible for the user to visually and easily recognize that each area on the map image corresponds to the travelable area corresponding to what percentage of the maximum charging energy amount.

The present invention is not limited to the above-mentioned embodiment, but various improvements and/or modifications may be made without departing from the broad spirit and scope of the underlying principles.

In the present embodiment, the navigation device 1 mounted in the electric vehicle that travels using only the drive motor 5 as the drive source is applied as an example. The drive motor 5 is driven based on the electric energy supplied from the battery 3. However, another vehicle may be applied provided that it has a structure in which the battery can be charged at the charging facility. For example, the navigation device 1 may be mounted in the plug-in hybrid vehicle. The plug-in hybrid vehicle can travel using the engine as the drive source; however, there is a demand for traveling with the drive motor as the drive source as much as possible. Therefore, the present invention is also valid to the plug-in hybrid vehicle.

In the present embodiment, as the travelable area, the first travelable area, within which the vehicle is able to travel by consuming 90% of the maximum charging energy amount of the battery 3, the second travelable area, within which the vehicle is able to travel by consuming 50% of the maximum charging energy amount of the battery 3, and the third travelable area, within which the vehicle is able to travel by consuming 30% of the maximum charging energy amount of the battery 3, are calculated (S6 to S9). However, the travelable area, within which the vehicle is able to travel by consuming another percentage (for example, 100%, 25%, and the like) of the maximum charging energy of the battery 3, may be calculated. Or, only one travelable area may be calculated instead of a plurality of travelable areas.

In addition, in the present embodiment, by varying the display color of the map image included in the first travelable area 52, the second travelable area 53, and the third travelable area 54, the display mode is varied between the map image included in each travelable area and the map image not included in each travelable area. However, the display mode may be varied in a method other than by varying the color. The purpose is to enable the one viewing the display to be able to distinguish the different areas.

Figure 9:
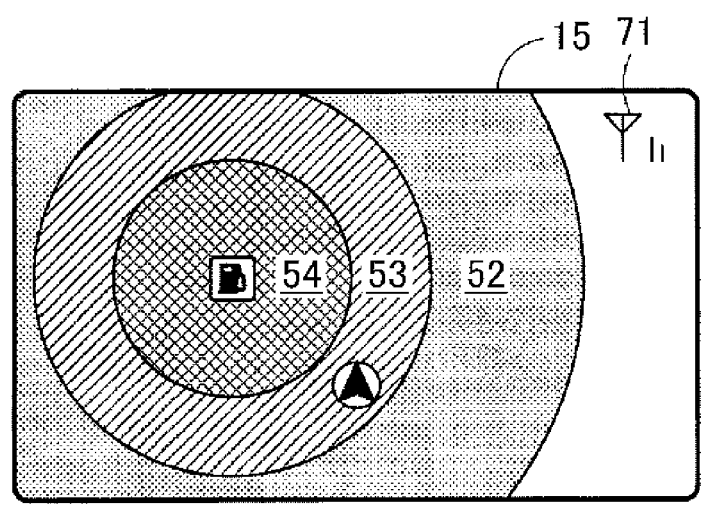
FIG. 9 shows an example of a modification of the display mode of the map image displayed on the liquid crystal display.

In addition, a mark 71 indicating the area where the vehicle 2 is currently traveling may be displayed on the liquid crystal display 15 as shown in FIG. 9. In the example of FIG. 9, the mark 71 with three antenna bars is displayed if the vehicle 2 travels in the first travelable area 52, the mark 71 with two antenna bars is displayed if the vehicle 2 travels in the second travelable area 53, and the mark 71 with one antenna bar is displayed if the vehicle 2 travels in the third travelable area 54. Thereby, the user can clearly recognize a positional relation between the current position of the vehicle and the charging facility in the vicinity of the vehicle.

Further, in the present embodiment, when the area in the vicinity of the current position of the vehicle is displayed on the liquid display 15, the display color of the map image included in the first travelable area 52 to the third travelable area 54 is varied. However, also when the area other than the vicinity of the current position of the vehicle is displayed on the liquid display 15 by scrolling the map, the display color of the map image included in the first travelable area 52 to the third travelable area 54 may be varied. In such case, the user can recognize the area covered and the area not covered by the charging facility even for the place far from the current position of the vehicle.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A vehicular travel guidance device comprising:
    a map image display unit that displays a map image on a display device;
    a maximum energy amount acquisition unit that acquires an existing charging energy amount of an in-vehicle battery of a vehicle that has a drive motor as a drive source, the drive motor being driven by energy stored in the in-vehicle battery;
    a charging facility information acquisition unit that acquires information regarding a charging facility capable of charging the in-vehicle battery;
    a travelable area acquisition unit that, based on the existing charging energy amount of the vehicle acquired by the maximum energy amount acquisition unit and the information regarding the charging facility acquired by the charging facility information acquisition unit, acquires a travelable area, within which the vehicle is able to travel from the charging facility by consuming an energy amount corresponding to a predetermined percentage of the existing charging energy amount that is less than an existing charging energy amount; and
    a display mode change unit that varies a display mode of the map image based on the acquired travelable area,
    wherein the travelable area is highlighted and displayed around the charging facility.

2. The vehicular travel guidance device according to claim 1, wherein
    the travelable area acquisition unit acquires the travelable area for each of a plurality of percentages, each representing a different predetermined percentage of the existing charging energy amount; and
    the display mode change unit varies the display mode of the map image based on the acquired travelable areas.

3. The vehicular travel guidance device according to claim 1, comprising a charging facility search unit that searches for the charging facility located in the travelable area, within which the vehicle is able to travel from a predetermined point on the map image displayed on the display device by consuming the existing charging energy amount, wherein
    the travelable area acquisition unit acquires the travelable area, within which the vehicle is able to travel from the charging facility searched by the charging facility search unit.

4. The vehicular travel guidance device according to claim 1, further comprising a battery remaining amount guidance unit that provides information on a remaining energy amount of the in-vehicle battery using a color corresponding to a percentage of the existing charging energy amount, wherein
    the display mode change unit displays the map image included in the travelable area, within which the vehicle is able to travel by consuming the energy amount corresponding to the predetermined percentage of the existing charging energy amount, in the color corresponding to the predetermined percentage among colors given by the battery remaining amount guidance unit for providing the information.

5. The vehicular travel guidance device according to claim 1, wherein the display mode change unit that varies the display mode between the map image included in the travelable area and the map image not included in the travelable area.

6. The vehicular travel guidance device according to claim 1, wherein the display mode change unit varies the display mode of the map image by highlighting a portion of the map image corresponding to the travelable area in a predetermined color.

7. The vehicular travel guidance device according to claim 2, wherein the display mode change unit varies the display mode of the map image by highlighting portions of the map image corresponding to the travelable areas in a different predetermined color for each travelable area of the travelable areas.

8. A vehicular travel guidance method, the method comprising:

displaying a map image on a display device;
  acquiring an existing charging energy amount of an in-vehicle battery of a vehicle that has a drive motor as a drive source, the drive motor being driven by energy stored in the in-vehicle battery;
  acquiring information regarding a charging facility capable of charging the in-vehicle battery;
  acquiring, based on the existing charging energy amount of the vehicle acquired at the existing energy amount acquisition step and the information regarding the charging facility acquired at the charging facility information acquisition step, a travelable area, within which the vehicle is able to travel from the charging facility by consuming an energy amount corresponding to a predetermined percentage of the existing charging energy amount that is less than the existing charging energy amount; and
  varying a display mode of the map image based on the acquired travelable area,
  wherein the travelable area is highlighted and displayed around the charging facility.

9. The vehicular travel guidance method according to claim 8, wherein the display mode is varied between the map image included in the travelable area and the map image not included in the travelable area.

10. A computer program stored on a non-transitory computer readable medium that causes a computer to perform the functions of:

displaying a map image on a display device;
  acquiring an existing charging energy amount of an in-vehicle battery of a vehicle that has a drive motor as a drive source, the drive motor being driven by energy stored in the in-vehicle battery;
  acquiring information regarding a charging facility capable of charging the in-vehicle battery;
  acquiring, based on the existing charging energy amount of the vehicle acquired by the existing energy amount acquisition function and the information regarding the charging facility acquired by the charging facility information acquisition function, a travelable area, within which the vehicle is able to travel from the charging facility by consuming an energy amount corresponding to a predetermined percentage of the existing charging energy amount that is less than the existing charging energy amount; and
  varying a display mode of the map image based on the acquired the travelable area,
  wherein the travelable area is highlighted and displayed around the charging facility.

11. The computer program according to claim 10, wherein the display mode is varied between the map image included in the travelable area and the map image not included in the travelable area.

* * * * *